United States Patent Office 2,720,509
Patented Oct. 11, 1955

2,720,509

SULFUR-CONTAINING RESINS FROM 4-VINYL-1-CYCLOHEXENE

Asa C. Dees, Cushing, Okla., assignor to Phillips Petroleum Company, a corporation of Delaware No Drawing. Application September 8, 1952,
Serial No. 308,501

13 Claims. (Cl. 260—79)

This invention relates to the production of sulfur-containing resinous bodies or polymers.

The interaction of hydrogen sulfide with 4-vinyl-1-cyclohexene, in the presence of solid contact catalysts, to yield vinylcyclohexanethiols has been described and claimed in application Serial No. 308,715 filed September 8, 1952, by James E. Pritchard and Fredrick M. Smith. The product of this reaction, which comprises a mixture of vinylcyclohexanethiols, is a colorless liquid having a boiling point of 98–101° C. at 35 mm. mercury and a refractive index, N 20/D, of 1.5106.

I have now discovered that sulfur-containing resinous polymers can be obtained by the direct reaction of hydrogen sulfide with 4-vinyl-1-cyclohexene in the presence of acid-type catalysts provided certain steps and conditions, critically different from those of the above-mentioned application, are followed. The products range from light yellow to dark colored viscous liquids to a glassy solid which is a deep amber color by transmitted light and dark reddish-brown by reflected light. The solid is easily fractured and can be readily ground to give a yellow powder. These materials have a sulfur content not to exceed 20 per cent by weight and the preferred products have a sulfur content in the range between 3 and 10 per cent by weight.

The catalysts employed for preparing the resinous polymers of this invention are preferably liquid, acid-type catalysts. Among the materials preferred are hydrofluoric acid in concentrations of 50 per cent or higher, anhydrous hydrogen fluoride, boron fluoride complexes or compositions with water, phosphoric acid, hydrofluoric acid, and the like. It is here noted that while several different catalysts have been mentioned that the said catalysts are known not to be equivalents in all respects and that with each the specific conditions and results may be different. Other acid catalysts which are applicable include aluminum chloride, zinc chloride, and ferric chloride.

The process of this invention can be carried out in a single reaction step or it can comprise two reaction steps followed by suitable treatment for the separation of the catalyst and recovery of the products. When the reaction is carried out in a single step, the hydrogen sulfide and 4-vinyl-1-cyclohexene are brought into contact with the catalyst, such as boron fluoride-water complex, at a temperature in the range between 0 and 300° F. for a period generally in the range from 0.5 to 2.5 hours. The reaction mixture is agitated during the reaction. The reactor contents are then cooled to room temperature, the catalyst is separated, and the resinous products, ranging from viscous liquids to solids, are recovered. The reaction temperature is an important factor in determining the nature of the reaction products. In general, when operating in the lower portion of the temperature range, such as between 0 and 125° F., the products are predominantly liquid while higher temperatures favor the formation of solid resinous materials.

The process of this invention is frequently carried out in two reaction steps, particularly when it is desired to prepare solid resinous products. When operating in this manner, the hydrogen sulfide and 4-vinyl-1-cyclohexene are first brought into contact with the catalyst, such as boron fluoride-water complex, at a temperature in the range between 0 and 125° F. After the reaction has been allowed to proceed for a short time, usually 10 to 30 minutes, the temperature is increased, for the second step of the reaction, to 250 to 300° F. for a period generally in the range from one to two hours. The reactor contents are then cooled to room temperature, the catalyst is separated, and the resinous products are recovered.

When carrying out the first step of the reaction, it is generally preferred to charge the catalyst to the reactor and then introduce the olefin and hydrogen sulfide either separately or blended in the desired proportions. When an olefin-$H_2S$ blend is used, it is generally fed into the reactor, either continuously or intermittently, at a rate not in excess of one at which the exothermic heat involved can be controlled to maintain a temperature within the range specified herein. The reactor is provided with an agitating means to aid contact of the reactants and catalyst. Cooling means should also be provided. It is also possible to precool the reactants.

It is also possible to employ a continuous reaction zone wherein the reaction mass is continuously moved from one point therein to another. If desired the catalyst can be admixed with $H_2S$ and the olefin then added thereto at one or a plurality of points. Other manners of bringing together the reactants and catalyst are possible it being essential however that the temperature at the points of reaction be controlled as set forth herein.

After all the 4-vinyl-1-cyclohexene and hydrogen sulfide have been introduced into the reactor, the reaction mixture is agitated for a short time, say from 10 to 30 minutes, to allow the reaction to continue. Agitation is discontinued and the temperature is then increased to 250 to 300° F. for the second step of the process.

After the completion of the two process steps as described above, the reaction mixture is treated with a suitable solvent which dissolves the catalyst and the resinous products. Ether has been found to be a satisfactory solvent for this purpose. The ether solution is washed with water to remove the catalyst after which the ether is removed and the resin recovered. The resin, which is a dark, reddish-brown liquid, is distilled under reduced pressure to remove unreacted 4-vinyl-1-cyclohexene and any vinylcyclohexanethiols which have been formed and to separate liquid resinous products from solid products.

The mol ratio of hydrogen sulfide to 4-vinyl-1-cyclohexene is generally in the range from 1:1 to 6:1. It is preferred to operate with an excess of hydrogen sulfide, say at least 1.5 mols hydrogen sulfide per mol of olefin.

The over-all ratio of catalyst to olefin-$H_2S$ blend is generally in the range from 0.25:1 to 2:1 parts by weight and preferably at least 0.5:1 parts by weight.

The interaction of hydrogen sulfide with 4-vinyl-1-cyclohexene can be effected at atmospheric pressure but, if desired, superatmospheric pressure can be employed. In many instances it is considered advantageous to operate at superatmospheric pressure to prevent volatilization of the hydrogen sulfide or volatile catalyst, when such is employed.

It is to be noted that the reaction of the present invention is exothermic and that a means of operation which is frequently preferred for the successful performance of the invention is to control the temperature in the first step to release the exothermic heat without affecting the course of the reaction.

The resins of this invention are useful in the preparation of various plastic articles, as coating compositions, and the like.

Example I

A reactor open to the atmosphere was charged with 2.8 pounds of boron fluoride-water catalyst, and 5.58 pounds of a blend of 4-vinyl-1-cyclohexene and hydrogen sulfide in an olefin/H₂S mol ratio of 1:2 (weight ratio 1.59:1, i. e., 3.42 pounds 4-vinyl-1-cyclohexene and 2.16 pounds of H₂S) was introduced at a rate of 837 cc. per hour. The charging time was 2.75 hours. The mixture was stirred during charging of the olefin-H₂S blend and for 15 minutes thereafter. The temperature ranged from 50 to 104° F. employing external cooling means which were provided. The reaction was exothermic. The reaction mixture became very viscous toward the end of this period.

Agitation was discontinued and the reaction mixture was allowed to stand without external heating for about two hours. During this time the temperature of the mixture increased to 273° F. It was then cooled to room temperature. There was no further evidence of reaction. At the end of the run the reaction mixture weighed 6.978 pounds of an original total weight of reactants of 8.38 pounds. The loss of 1.402 pounds was considered to be H₂S loss. 0.76 pound H₂S was calculated to have remained in the reaction product. The vessel being open to the atmosphere H₂S unaccounted for was assumed to have escaped to the atmosphere.

The reaction mixture was then treated with ether which dissolved both the catalyst and resinous products. The ether solution was washed with water to remove the catalyst after which the ether was distilled. A dark reddish-brown liquid (2.48 pounds—6.05 per cent sulfur content remainder). It was calculated that of the 0.76 pound of H₂S consumed in the reaction 0.16 pound was contained in the ether-soluble portion thereof. It was distilled at a pressure of 10 mm. mercury to remove unreacted 4-vinyl-1-cyclohexene and a vinylcyclohexanethiol fraction. Continued distillation at 10 mm. mercury yielded a light yellow, liquid, resinous material which was separated into ten fractions. Sulfur analyses were made on five of these fractions. The kettle product was a glassy solid which was a deep amber color by transmitted light and dark reddish-brown color by reflected light. The solid was easily fractured and readily ground to give a yellow powder. It was also analyzed for sulfur. The following table shows results of the fractionation of the liquid resin, sulfur analyses, and weight per cent of each liquid fraction and the solid product. The weight per cent in each case is based upon the total weight of resinous product after removal of the 4-vinyl-1-cyclohexene and vinylcyclohexanethiol.

| Boiling range, ° F., 10 mm. Hg. | Wt. Percent | Percent S |
|---|---|---|
| 157–200 [1] | 2.66 | 17.97 |
| 200–230 | 3.34 | |
| 230–245 | 4.85 | 5.38 |
| 245–298 | 7.85 | |
| 298–322 | 6.95 | 8.44 |
| 322–348 | 6.76 | |
| 348–382 | 6.40 | 8.03 |
| 382–385 | 6.44 | |
| 385–418 | 6.61 | 7.92 |
| 418–442 | 3.98 | |
| Solid Resin | 44.2 | 4.24 |

[1] 12 mm. Hg.

Example II

Twenty-eight grams of a boron fluoride-water catalyst (a portion of the mixture obtained by treating 224 grams of water with 842 grams of boron fluoride) was charged to a pressure reactor which was located on a rocker platform. A blend containing 176 grams of 4-vinyl-1-cyclohexene and 123 grams hydrogen sulfide (1/2.22 mol ratio) was prepared and pressured to the reactor at a rate such that a temperature of 78–80° F. was maintained. After addition of the blend, the reactor was allowed to rock for 0.9 hour. The temperature was maintained at less than 100° F. substantially throughout the entire run.

Ether was added to the reactor contents to dissolve the viscous product and the resulting solution was washed repeatedly with water to remove the catalyst. During the course of washing, dilute aqueous ammonia was added to insure complete removal of the catalyst. The ether layer was dried over Drierite (anhydrous calcium sulfate), filtered, and distilled to remove ether and unreacted 4-vinyl-1-cyclohexene. The pot residue was a dark colored, viscous liquid which had a characteristic mercaptan odor. Of the total amount of 4-vinyl-1-cyclohexene charged, 13 weight per cent of this resinous material was obtained. It had a sulfur content of 8.8 per cent.

A small quantity of the resinous product was heated for an extended period of time in an open vessel with the temperature being maintained at a sufficiently low level to avoid carbonization. Thus, starting with a sample at room temperature and heating with gradually increasing temperature the temperature at the end of an hour was about 375° F. and for an extra period of 30 minutes the temperature was in the range 375–410° F. An increase in viscosity occurred and when cooled the material was semi-solid. It could be drawn into very long, fine threads.

The resins of this invention contain not over about 20 weight per cent, preferably less than about 10 weight per cent sulfur more specifically about 5–10 per cent by weight of sulfur.

Variation and modification are possible within the scope of the foregoing disclosure and the appended claims to the invention the essence of which is that there have been set forth and described a process for the production of certain novel and useful sulfur-containing resinous polymers and the said polymers, the said process comprising the interaction between hydrogen sulfide and 4-vinyl-1-cyclohexene, as detailed herein, in the presence of an acid type catalyst, as set forth under the conditions specified; the polymers having the desirable properties as stated; and that a method for recovering said polymers from the resulting reaction mass has been set forth also as detailed herein, the sulfur content of the resinous polymers being not in excess of about 20 weight per cent, generally less than about 10 weight per cent.

I claim:

1. The production of sulfur-containing resinous polymers, ranging from light yellow viscous liquids to a glassy solid having a deep amber color by transmitted light, from hydrogen sulfide and 4-vinyl-1-cyclohexene which comprises bringing together in a reaction zone hydrogen sulfide and 4-vinyl-1-cyclohexene, in the presence of a liquid, acid type catalyst, at a temperature controlled to be in the range 0–300° F., for a period of time sufficient to ensure thorough admixture of the said hydrogen sulfide and 4-vinyl-1-cyclohexene and to complete the formation therein of the said polymers and then recovering said resinous polymers from the reaction mass thus obtained.

2. The production of sulfur-containing resinous polymers from hydrogen sulfide and 4-vinyl-1-cyclohexene which comprises bringing together in an agitated pressure reaction zone hydrogen sulfide and 4-vinyl-1-cyclohexene, in an approximate ratio of 2:1, in the presence of a boron fluoride-water catalyst at a temperature maintained below about 100° F. for about 1 hour and then recovering resinous polymers from the reaction mass thus obtained.

3. A production of sulfur-containing resinous polymers according to claim 2 which comprises dissolving the reaction mass in ether, washing the solution obtained with water to remove catalyst therefrom, neutralizing any remaining catalyst, drying the ether layer, distilling the ether layer to remove ether and any unreacted 4-vinyl-1-cyclohexene, thus obtaining a dark-colored, viscous resinous material having a sulfur content of approximately 8 per cent and possessing a characteristic mercaptan odor as a distillation residue.

4. A production of a resin according to claim 3 in which the resinous product is heated in an open vessel at a temperature below that at which substantial carbonization would occur until an appreciable increase of viscosity occurs and then cooling to obtain a semi-solid resin which can be drawn into very long, fine threads.

5. The production of sulfur-containing resinous polymers, ranging from light yellow viscous liquids to a glassy solid having a deep amber color by transmitted light, from hydrogen sulfide and 4-vinyl-1-cyclohexene which comprises, in a first step, bringing together in a reaction zone, provided with agitation means, 1:1 to 6:1 mols hydrogen sulfide and 4-vinyl-1-cyclohexene, in the presence of an acid-type catalyst selected from the group consisting of hydrogen fluoride, boron fluoride-water, boron fluoride-hydrogen fluoride, boron fluoride-phosphoric acid, aluminum chloride, zinc chloride, and ferric chloride, the ratio of catalyst to reactants being in the range from 0.25:1 to 2:1 parts by weight, at a temperature controlled to be in the range between 0 and 125° F., for a period of time in the range 10–30 minutes to ensure thorough admixture of the said hydrogen sulfide and 4-vinyl-1-cyclohexene and the controlled release of heat of reaction which is evolved; then in a second step increasing the temperature of the total mass, thus obtaining temperatures in the range 250–300° F. for a period of time of from about 1 to about 2 hours; cooling the reaction mass and recovering therefrom the said polymers.

6. The production of polymers as in claim 2 where the cooled reaction mass is dissolved in ether, washed with water to remove the catalyst, the ether is then removed, and the resin thus produced is recovered.

7. The production according to claim 3 wherein the recovered resin is distilled under reduced pressure to remove therefrom any unreacted 4-vinyl-1-cyclohexene, any vinylcyclohexanethiols, and to separate the liquid resinous products from the solid resinous products which have been formed.

8. The production of sulfur-containing resinous polymers, ranging from light yellow viscous liquids to a glassy solid having a deep amber color by transmitted light, from hydrogen sulfide and 4-vinyl-1-cyclohexene, which comprises, in a first step, bringing together in a reaction zone, provided with agitator means, hydrogen sulfide and 4-vinyl-1-cyclohexene, in a molar ratio of 1:1 to 6:1 in the presence of boron fluoride-water catalyst, at a temperature in the range 0–125° F., for a period of time sufficient to ensure thorough admixture of hydrogen sulfide and 4-vinyl-1-cyclohexene and the control led release of heat of reaction which is evolved; then in a separate step increasing the temperature of the reaction mass to a temperature in the range 250–300° F. for a period of time of about 1 to about 2 hours by allowing the said mass to stand at room temperature, cooling the said mass and recovering therefrom the said polymers.

9. A light yellow viscous resinous liquid distilling at temperatures ranging from about 157 to about 442° F. at 10 mm. mercury said liquid containing not more than 20 per cent by weight of sulfur, and being derived from hydrogen sulfide and 4-vinyl-1-cyclohexene by a process according to claim 1.

10. The production of hydrogen sulfide-4-vinyl-1-cyclohexene polymers which comprises charging into a reactor equipped with an agitator and cooling means about 2.8 pounds of boron fluoride-water catalyst, and about 5.58 pounds of a blend of 4-vinyl-1-cyclohexene and hydrogen sulfide in a ratio of 1:2, the said 4-vinyl-1-cyclohexene and hydrogen sulfide blend being introduced to said reactor at a rate of about 837 cc. per hour for a total charging time of about 2.75 hours, agitating the reactor contents during the charging of the said blend and for a period of time thereafter of about 15 minutes, controlling the temperature during said addition of said blend and during said stirring to a temperature in the range of from 50–104° F., discontinuing agitation and allowing the mixture to stand at room temperature for about 2 hours, during which time the temperature of the mixture will increase, then cooling to room temperature, dissolving the reactor contents in ether, washing said ether solution with water to remove the catalyst therefrom, distilling the ether from said washed solution and recovering a dark reddish-brown liquid.

11. The production of polymers as in claim 8 wherein the said dark reddish-brown liquid is distilled under reduced pressure to recover a light yellow viscous resinous liquid material as a distillate and a glassy solid as a kettle product.

12. A light yellow viscous resinous liquid distilling at temperatures ranging from 320–460° F. at 10 mm. mercury and being derived from hydrogen sulfide and 4-vinyl-1-cyclohexene by a process which comprises bringing together in a reaction zone hydrogen sulfide and 4-vinyl-1-cyclohexene, in the presence of a liquid acid-type catalyst at a temperature controlled to be in the range 0–300° F. for a period of time sufficient to insure thorough admixture of the said hydrogen sulfide and the 4-vinyl-1-cyclohexene and to complete the formation in said reaction zone of said resinous liquid and then recovering said resinous liquid from the reaction mass thus obtained, said liquid containing not more than 20 weight per cent of said sulfur.

13. A glassy solid having a deep amber color by transmitted light and a dark reddish-brown color by reflected light, easily fractured and readily ground to yield a yellow powder, the said solid being derived from hydrogen sulfide and 4-vinyl-1-cyclohexene, and containing about 5 per cent by weight of sulfur by a process which comprises bringing together in a reaction zone hydrogen sulfide and 4-vinyl-1-cyclohexene, in the presence of a liquid acid-type catalyst at a temperature controlled to be in the range 0–300° F. for a period of time sufficient to insure thorough admixture of the said hydrogen sulfide and the 4-vinyl-1-cyclohexene and to complete the formation in said reaction zone of said glassy solid and then recovering said glassy solid containing about 5% by weight of sulfur.

References Cited in the file of this patent

UNITED STATES PATENTS 2,551,813     Pinkney _____ May 8, 1951